A. E. ROBINSON & A. M. SOSA.
BALL BEARING.
APPLICATION FILED JUNE 29, 1917.
1,268,153.
Patented June 4, 1918.
2 SHEETS—SHEET 1.
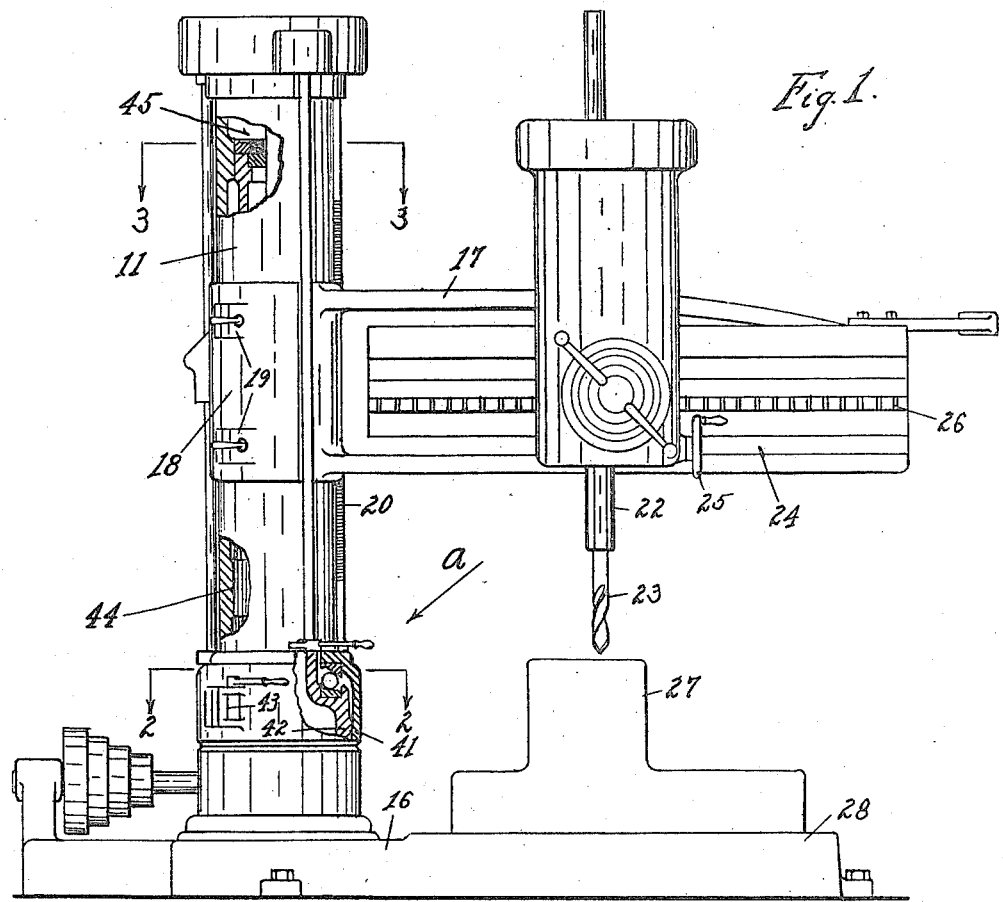
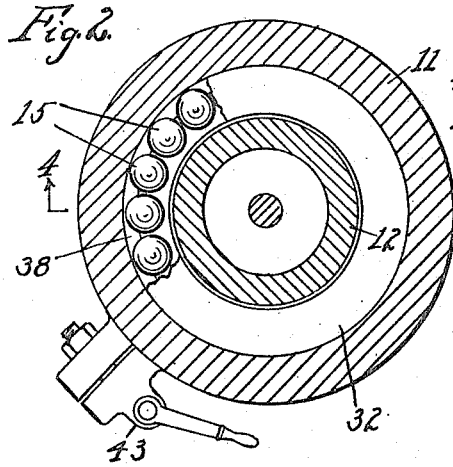
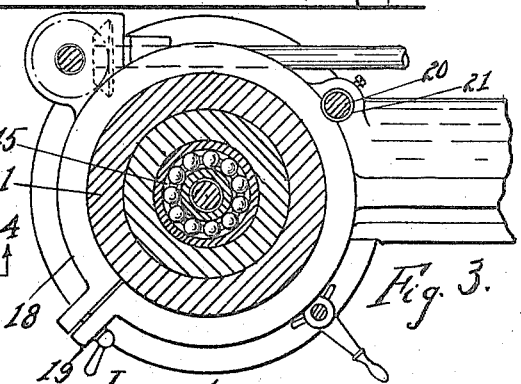
Inventors:
Albert E. Robinson
Augustus M. Sosa,
by their Attorneys

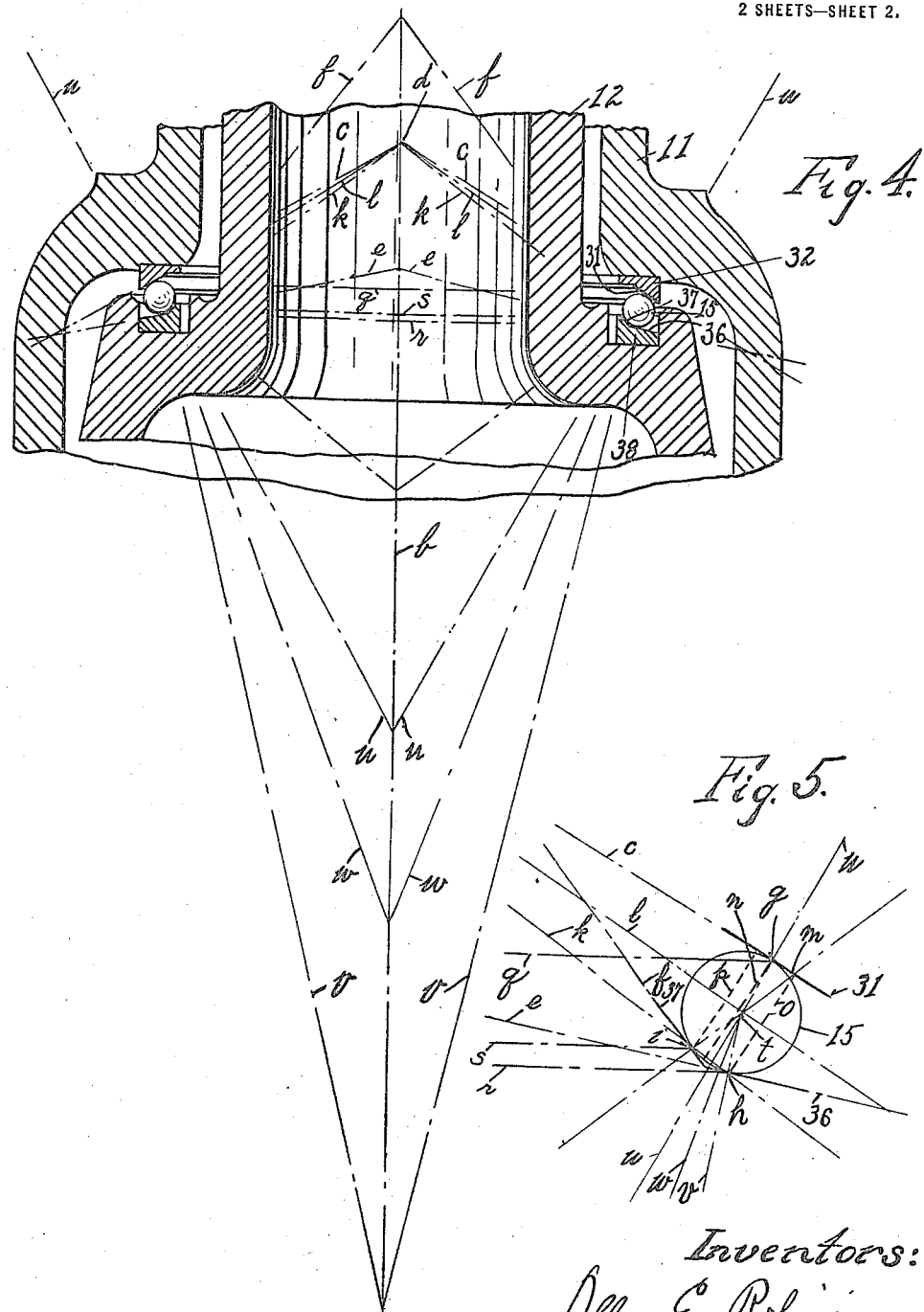

UNITED STATES PATENT OFFICE.

ALBERT E. ROBINSON AND AUGUSTUS M. SOSA, OF CINCINNATI, OHIO, ASSIGNORS TO THE AMERICAN TOOL WORKS COMPANY, OF CINCINNATI, OHIO, A CORPORATION OF WEST VIRGINIA.

BALL-BEARING.

1,268,153.  Specification of Letters Patent.  Patented June 4, 1918.

Application filed June 29, 1917. Serial No. 177,726.

*To all whom it may concern:*

Be it known that we, ALBERT E. ROBINSON and AUGUSTUS M. SOSA, citizens of the United States, residing at Cincinnati, in the county of Hamilton and State of Ohio, have jointly invented certain new and useful Improvements in Ball-Bearings, of which the following is a specification.

Our invention relates to ball bearings, especially adapted for heavy supporting duty, for instance, in metal working machinery, and we have instanced its use in a radial drilling machine, and utilized for supporting the rotatable column which has the drill-arm thereon.

In a radial drilling machine the column is a heavy body, usually in the form of a sleeve received about a post. It carries the drill-arm thereon, and the drill-arm has a usual tool-slide thereon, the tool-slide being laterally adjustable on the arm, and the arm and tool-slide usually supporting the driving means for rotating the drill spindle and feeding the same axially, many of the parts in practice being mounted on the slide and sliding back and forth on the arm with the slide toward and from the column.

The column, arm, slide and driving means usually have great weight, and the bearing for the column is therefore subjected to great stresses which are at different times directed against the bearing in different directions, due to the various distances from the column which the tool-slide assumes at different adjustments.

It is very important in machinery of this character, that the column shall be readily rotatable and that little exertion be required for moving the column about its center in order to easily adjust the tool-spindle to different positions about the axis of the column in accordance with the requirements of the work being done.

It is the object of our invention to provide a heavy duty bearing which permits ready shifting or rotation of the load, and which accommodates stresses of the load thereon in different directions; further, to provide an improved bearing which acts to self-center the supported member upon the support; and further, to provide a ball-bearing, the bearing surfaces of which, coacting with the balls, are in the form of right circular frusto-cones, so arranged as to receive bearing balls between them, the load exerting bearing stresses upon the balls in novel manner to act to self-center the supported member upon the supporting member, and to avoid binding action between the balls and bearing surfaces coacting therewith.

It is a further object of our invention to provide a novel ball bearing arranged for end thrust and for radial resistances in such manner that the balls shall have true rolling relation as near as mechanically possible with the bearing surfaces coacting with the balls, the latter arranged for three-point contact with the respective balls, the three points of contact being located in a cone generated by the rolling action of the ball and having an axis of rotation eccentric to the center of gravity of the ball; and, further, to so construct the bearing that annular paths of contact of different diameters are described on the respective balls about the axes of rotation of said respective balls, these annular paths coacting with annular paths of contact of different and proportional diameters on said bearing surfaces of the races concentric with the axis of rotation of the bearing.

The invention will be further readily understood from the following description and claims, and from the drawings, in which latter:

Figure 1 is a front elevation of a radial drilling machine partly broken away, embodying our invention.

Fig. 2 is a cross-section taken in the plane of the line 2—2 of Fig. 1, and partly broken away.

Fig. 3 is a cross-section, taken in the plane of the line 3—3 of Fig. 1.

Fig. 4 is an enlarged axial section of our improved device, taken in the plane of the line 4—4 of Fig. 2; and, Fig. 5 is an enlarged diagrammatic representation of our invention.

Our invention is applicable in various relations in which a ball-bearing is employed for the primary purpose of resisting end thrusts, and for the secondary purpose of resisting radial forces, and is exemplified as employed for supporting the rotatable column in a metal radial drilling machine, in which the rotatable column 11 represents the rotatable member of the ball bearing, and the post 12 represents the stationary member of the ball bearing, although it is understood that the relation of the rotatable and stationary members may be reversed, or that both members may be rotatable, within the spirit of our invention. The bearing balls are represented at 15.

The post, in the present exemplification, extends upwardly from a suitable base 16. The rotatable column is arranged to support a drill-arm 17 of ordinary or usual construction, as by a bearing 18 received about the column and arranged to be clamped thereto in adjusted positions by means of a clamp 19, the drill-arm being raised and lowered on the column by means of a raising and lowering screw 20 having threaded connection therewith by means of a threaded nut 21 secured in the drill-arm, the screw being arranged to be rotated in either direction in any ordinary or well-known manner for raising or lowering the drill-arm and for starting and stopping the rotation of the screw-rod.

The tool-slide has a drill-spindle 22 rotatable therein, arranged to have a suitable drill 23 releasably secured thereto, the tool-slide being adjustable laterally in usual manner, on a guideway 24 on the arm, as by means of a hand-wheel 25 operating a usual gear-train coacting with a toothed rack 26 on the arm, so as to position the tool-slide at selective distances from the column, depending on the position at which the drilling tool is to coöperate with the work, exemplified at 27, suitably supported by table 28 on the base. The drill-spindle is arranged to be rotated at selective speeds and to be started and stopped as desired, and to be fed axially by suitable and ordinary mechanism mounted on the drill-arm and tool-slide, but not shown because well known.

The rotatable column, drill-arm, tool-slide and operating parts for the tool-spindle, are heavy and exert a quite considerable tilting force upon the column, which force varies according to the distance from the column to which the tool-slide is adjusted on the drill-arm, it being remembered that the drill-arm is often quite long and that the leverage exerted by the latter and the tool-slide thereon increases with the distance of the tool-slide from the column. The general direction of this force is indicated by the arrow $a$, this direction changing according to the adjustment of the tool-slide toward and from the column. The axis of rotation of the rotatable column is indicated by the dotted line $b$.

We have found it desirable that the ball bearing be so constructed as to self-center the column about the post.

During employment of the drilling machine, it is necessary to frequently shift the drill-arm to different radial positions with relation to the support of the column, and it is desirable that the shifting be accomplished with little exertion, so as to readily position the center of the drilling tool with relation to the work, which adjustment is usually very delicate and must be accurately made.

In order to accomplish these results and provide a ball bearing also useful in other relations where it is desired to resist end thrusts, as well as radial forces, we have provided our improved ball bearing in which the respective bearing balls are contacted at three points, each of which is located in a right circular frusto-conical bearing surface, the points in these latter bearing surfaces being located different distances from the axis of rotation of the bearing, and located in a frusto-cone generated by the rotation of the bearing ball about its axis.

Thus the member 11 is provided with a frusto-conical bearing surface 31, instanced as formed on a bearing-ring 32 rigid with the member 11.

The member 12 is provided with a right circular frusto-conical bearing surface 36 and with a right circular frusto-conical bearing surface 37, the slants of the elements of the respective bearing surfaces being at relatively different inclinations. The bearing surfaces 36, 37, are instanced as on a bearing ring 38 rigid with the member 12.

The slant of the elements, instanced at $c$, of the cone of the frusto-conical bearing surfaces 31, extends at an acute angle of more than forty-five degrees toward the axis of rotation $b$, and is instanced as intersecting said axis at the point $d$. The slant of the elements of the frusto-conical bearing surface 36, is also preferably at an acute angle of more than forty-five degrees to the axis of rotation $b$, as indicated at $e$, and the slant of the elements of the frusto-conical bearing surface 37 is at an acute angle of less than forty-five degrees with relation to the axis of rotation, as indicated at $f$, and when extended intersects the angles $e$ and $c$.

The point of contact of the bearing ball with the frusto-conical bearing surface 31, is instanced at $g$, the point of contact of the bearing ball with the frusto-conical bearing surface 36 is instanced at $h$, and the point of contact of the bearing ball with the frusto-conical bearing surface 37 is instanced at $i$. (See Fig. 5.)

A line $k$, instanced as intersecting the points $d$, $i$ and $h$, forms a line in the lateral surface of a right circular cone generated about the axis of rotation $l$ of the ball in which the points $g$, $h$ and $i$, are located. (See Figs. 4 and 5.) The frustum $m$ of said cone has the points $h$ and $i$ in its bases, these bases having relatively larger and smaller diameters. The frusto-cone $m$ has the point $g$ in its lateral surface. The points $g$, $h$ and $i$ are located respectively in annular lines of contact or annular paths $n$, $o$ and $p$ on the spherical surface of said ball about the axis of rotation of the frusto-cone $m$. The path $n$ on the ball is concentric with the axis of said frusto-cone, while the paths $o$ and $p$ on the ball are eccentric to said axis.

The point of contact between the circle $n$ and the frusto-conical surface 31, instanced at $g$, is located a greater distance, instanced by the distance line $q$, from the axis of rotation $b$ of the bearing, than the distance from said axis, instanced by the distance line $r$, at which the point of contact $h$ between the circular line of contact $o$ and the frusto-conical surface 36, is located; and the latter point is at a greater distance from the axis of rotation $b$ of the bearing, than the distance from said axis instanced by the distance line $s$, at which the point of contact $i$ between the circular line of contact $p$ on the ball and the frusto-conical surface 37, is located from said axis.

It will thus be seen that the circular path $n$, which is the longest circular path on the ball, coacts with the frusto-conical surface 31 along a circular line or annular path having the axis of rotation $b$ as its center, which is the circular line or annular path of greatest diameter on the coacting conical bearing surfaces. Further, that the circular line of contact $o$ on the ball, which has an intermediate length of diameter, coacts along a circular line of contact or annular path on the bearing surface 36, described about the axis of rotation $b$, which is the circular line of contact or annular path on said bearing surfaces having the intermediate length of diameter, and that the circular line of contact $p$ on the ball, which is the circle of contact or annular path on the ball having the shortest diameter, coacts with a circle of contact or annular path on the frusto-conical bearing surface 37, described about the axis of rotation $b$, which is the smallest of the circles of contact or annular paths on said bearing surfaces about said axis of rotation $b$.

The axis of the cone $m$ is located to one side of the center of gravity $t$ of the ball, instanced as above said center of gravity, placing the axis of rotation of the ball eccentric to its center.

The cones formed by the surfaces 31 and 36 when extended are superposed one above the other. The tendency of the action of the right circular frusto-conical bearing surface 31 of the member 11 of the bearing upon the bearing balls, is to move the bearing balls toward the axis of rotation of the bearing, and the tendency of the right circular frusto-conical bearing surface 36 of the member 12 of said bearing upon the bearing balls, is to move said balls away from the axis of rotation of the bearing, due to the incline effects of said bearing surfaces, the action of the bearing surface 36 to move the bearing balls away from the axis of rotation of the bearing being however preferably not sufficient to overcome the incline effect of the bearing surface 31 upon said annularly arranged bearing balls.

The line of force exerted by the slant of any given element of the frusto-conical bearing surface 31, may be instanced by the dotted line $u$, and the line of force of the incline effect of the slant of any given element of the frusto-conical bearing surface 36, may be instanced by the dotted line $v$, the resultant of said lines of force being a mesne line of force, instanced by the dotted line $w$, the said lines of force and said mesne line of force being preferably extending at acute angles toward the axis of rotation $b$, the said lines of force converging as elements of a cone toward and intersecting the axis of rotation at a distance below the ball bearing, and forming a bearing which is primarily an end thrust bearing, so that the major portion of the duty of the bearing may be exerted in supporting the weight or axial force applied thereto.

In order, however, to maintain the bearing balls in their true paths of movement, the frusto-conical bearing surface 37 is provided, the slant of any given element of which is acute with relation to the axis of rotation of the bearing, so as to form a lateral wall in position to resist any undue radial force between the members of the bearing, and arranged especially with a view of resisting such radial forces throughout a great range of angular presentations of said forces, with relation to the axis of rotation of the bearing.

For instance, in the present exemplification, when the tool-slide is closely adjacent to the rotatable column, the radial force is at a minimum and in a line at the least angle to the axis of rotation of the bearing, but when the tool-slide is at the extreme outer end of the drill-arm, then the radial force is at greatest angle to said axis of rotation. The arrangement of the frusto-conical bearing surface 37, so that the slant of its elements is at an acute angle of less than forty-five degrees to the axis of rotation, counteracts such radial forces throughout their entire range with least resistance, and minimizes a wedging action between the bearing surfaces 36, 37, the slants of the elements of which are at obtuse angles with relation to each other, and at acute angles of less than forty-five degrees with relation to the bearing surface 31, the bearing surfaces 31, 36 intersecting each other outside the cylindrical projection of the ball-bearing, and outside the post.

This action is aided by having the frusto-conical bearing surface 31 as an inner or inverted cup-shaped bearing surface, so that any lateral forces transmitted thereby to the bearing balls, will be resisted by the entire weight of the column and its supported parts, for the reason that to cause a lateral movement between the frusto-conical bearing surface 31 and the bearing ball located in said line of force would necessitate a climbing of said bearing surface along its incline upon the ball.

Our improved bearing, therefore, affords a ball bearing having minimum friction between the members, enables comparatively large balls to be employed, and causes self-centering between said members for relieving friction in adjacent bearings. For instance, in the present exemplification, the rotary column is provided with a clamp-bearing 41 about a journal 42 of the post, the clamp-bearing being a split-bearing arranged to be clamped about its journal by means of a clamp 43 of usual construction, the clamp being arranged to be unclamped to permit rotation of the rotary column, and being clamped upon adjustment being made. A usual journal bearing 44 is in practice also usually located between the post and the rotary column. In order to further assist the maintenance of perpendicular position of the column, we provide an annular radial ball bearing 45 between the upper portions of the post and column.

Having thus fully described our invention what we claim as new and desire to secure by Letters Patent, is:

1. In a column bearing, the combination with the column, of a support upon which said column is arranged to turn, a race for said column, races for said support, and bearing balls between said races, said first-named race having a right circular frusto-conical bearing surface coacting with said balls the slant of the elements whereof is at an acute angle of more than forty-five degrees to the axes of said races, said second-named races respectively having right circular frusto-conical bearing surfaces the slants of the elements whereof are respectively at an acute angle of more than forty-five degrees and at an acute angle of less than forty-five degrees to said axes, and said first-named angle being more acute than said second-named angle.

2. In a column bearing, the combination with the column, of a post about which said column is arranged to turn, a race for said column, races for said post, said races being located between the lower portions of said column and post, and bearing balls between said races, said first-named race having a right circular frusto-conical bearing surface coacting with said balls, the slant of the elements whereof is at an acute angle of more than forty-five degrees to the axes of said races, said second-named races respectively having right circular frusto-conical bearing surfaces the slants of the elements whereof are respectively at an acute angle of more than forty-five degrees and at an acute angle of less than forty-five degrees to said axes, and said first-named angle being more acute than said second-named angle, and a radial resistance bearing between the upper portions of said post and column.

3. In a column bearing, the combination with the column, of a post about which said column is arranged to turn, and bearing balls between said column and said support, said column provided with a right circular frusto-conical bearing surface the slant of the elements whereof is at an acute angle of more than forty-five degrees to its axis, said support provided with a pair of right circular frusto-conical bearing surfaces the slant of the elements of one of said last-named bearing surfaces being at an acute angle of more than forty-five degrees to said axis and more acute than said first-named acute angle, the slant of the elements of the other of said last-named bearing surfaces being at an acute angle of less than forty-five degrees to said axes, and said bearing balls located between said races.

4. In a column bearing, the combination with the column, of a post about which said column is arranged to turn, and bearing balls between the lower portions of said column and said support, said column provided with a right circular frusto-conical bearing surface the slant of the elements whereof is at an acute angle of more than forty-five degrees to its axis, said support provided with a pair of right circular frusto-conical bearing surfaces the slant of the elements of one of said last-named bearing surfaces being at an acute angle of more than forty-five degrees to said axis and more acute than said first-named acute angle, the slant of the elements of the other of said last-named bearing surfaces being at an acute angle of less than forty-five degrees to said axes, said bearing balls located between said races, and a radial ball bearing between the upper portions of said column and post.

5. In a column bearing, the combination with the column, of a support upon which said column is arranged to turn, and bearing balls between said column and support, said column provided with an inwardly facing right circular frusto-conical bearing surface and said support provided with an outer right circular frusto-conical bearing surface, the slants of the elements of said respective bearing surfaces, when extended, intersecting outside the cylindrical projection of said bearing balls, and an outwardly facing right circular frusto-conical bearing surface the slant of the elements whereof is at an obtuse angle to the slant of the elements of one of said first-named bearing surfaces and at an acute angle of less than forty-five degrees to the slant of the other of said first-named bearing surfaces and to the axes of said bearing surfaces, said bearing balls received between and coacting with said bearing surfaces.

6. In a ball bearing, the combination of a pair of bearing members, and bearing balls between said members, one of said members provided with a right circular frusto-conical bearing surface, the other of said members provided with a pair of right circular frusto-conical bearing surfaces the slants of the elements whereof are at acute angles to the slant of the elements of said first-named bearing surfaces, and said bearing balls located between and coacting with said bearing surfaces.

7. In a ball bearing, the combination with a pair of bearing members, and bearing balls between said members, one of said members provided with a right circular frusto-conical bearing surface, the other of said members provided with a pair of right circular frusto-conical bearing surfaces the slants of the elements whereof are at acute angles to the slant of the elements of said first-named bearing surfaces, the slant of the elements of one of said pair of bearing surfaces being at an acute angle of less than forty-five degrees to the axes of said bearing surfaces, the slants of the elements of the others of said bearing surfaces being at acute angles of more than forty-five degrees to said axes, and said bearing balls located between and coacting with said bearing surfaces.

8. In a ball bearing, the combination of a pair of bearing members, and bearing balls between said members, one of said members provided with concentric right frusto-conical bearing surfaces coacting with said bearing balls, the slants of the elements whereof are disposed at obtuse angles with relation to each other and inclined toward the axes of said bearing surfaces, and the other of said members provided with a coacting right frusto-conical bearing surface the slant of the elements whereof is disposed at an acute angle relative to the slants of the elements of said first-named bearing surfaces.

9. In a ball bearing, the combination of a pair of bearing members, said bearing members provided with annular races, and bearing balls between said races, one of said races having an inwardly presented frusto-conical bearing face and the other of said races having outwardly presented concentric frusto-conical bearing faces of different inclinations differing from the inclination of said inner inwardly presented frusto-conical bearing face.

10. In a ball bearing, the combination of a pair of bearing members, and bearing balls between said members, said members respectively provided with right frusto-conical bearing surfaces whose lateral surfaces slant relatively to form superposed cones, when extended, coacting with said bearing balls to relatively center said members, and one of said members provided with an additional right frusto-conical bearing surface the lateral surface whereof slants obtusely to one and acutely to the other of said first-named bearing surfaces for confining said bearing balls between said first-named bearing surfaces.

11. In a column bearing, the combination of a column, a post therefor, said column and post provided with right circular frusto-conical thrust bearing surfaces whose lateral surfaces slant relatively to form superposed cones, when extended, and bearing balls located between said bearing surfaces, and said post provided with an additional right circular frusto-conical bearing surface, the lateral surface whereof slants obtusely to one and acutely to the other of said first-named bearing surfaces and forms a radial bearing surface for said bearing balls.

In testimony whereof, we have hereunto signed our names in the presence of two subscribing witnesses.

ALBERT E. ROBINSON.
AUGUSTUS M. SOSA.

Witnesses:
G. H. ROBINSON,
E. R. GROSSMAN.